(12) United States Patent
Yoshida

(10) Patent No.: US 7,402,775 B2
(45) Date of Patent: Jul. 22, 2008

(54) VEHICULAR SHOCK-ABSORBING BEAM

(75) Inventor: Hiroshi Yoshida, Soja (JP)

(73) Assignee: Asteer Co., Ltd., Okayama (JP)

( * ) Notice: Subject to any disclaimer, the term of this patent is extended or adjusted under 35 U.S.C. 154(b) by 157 days.

(21) Appl. No.: 11/401,001

(22) Filed: Apr. 10, 2006

(65) Prior Publication Data

US 2006/0237245 A1    Oct. 26, 2006

(30) Foreign Application Priority Data

Apr. 21, 2005   (JP)   ............................. 2005-123214

(51) Int. Cl.
  *B60L 1/02*   (2006.01)
(52) U.S. Cl. .................................... 219/202
(58) Field of Classification Search ................ 219/202, 219/735.1; 52/745.19, 737.1; 148/572
  See application file for complete search history.

(56) References Cited

U.S. PATENT DOCUMENTS 3,972,744 A * 8/1976 Cantrell ...................... 148/572
6,918,224 B2 * 7/2005 Tjoelker et al. .......... 52/745.19

FOREIGN PATENT DOCUMENTS

| JP | 44-14455 | 6/1969 |
|---|---|---|
| JP | 09-002066 | 1/1997 |
| JP | 10-166860 | 6/1998 |
| JP | 3139984 | 12/2000 |
| JP | 2003-094943 | 4/2003 |

* cited by examiner

*Primary Examiner*—Tu B Hoang
*Assistant Examiner*—Vinod D Patel
(74) *Attorney, Agent, or Firm*—William L. Androlia; H. Henry Koda

(57) ABSTRACT

A vehicular shock-absorbing beam includes a pair of mounting portions disposed at the both ends of a beam body and adapted to be mounted on a vehicle. The shock-absorbing beam is produced by a thermal treatment equipment for the heat treatment of the beam. The thermal treatment equipment comprises a pair of holding means for holding the beam body, a pair of current-applying means for directly applying current to the beam body, and quenching means for quenching the heated beam body. One of the paired holding means or that of the paired current-applying means can be slidable. The quenching means sandwiches the beam body with a lower jig and an upper jig both having corrugated surfaces. The heated beam body is quenched with a coolant sprayed from a plurality of the injection holes formed in the upper and lower corrugated surfaces.

3 Claims, 10 Drawing Sheets

VEHICULAR SHOCK-ABSORBING BEAM

TECHNICAL FIELD

The present invention relates to a vehicular shock-absorbing beam as an automotive member hardened by directly applying electricity and to a thermal treatment equipment for hardening the vehicular shock-absorbing beam.

BACKGROUND OF THE INVENTION

Most of automotive members are required to have a high structural strength. This requirement can be satisfied by various methods such as a selection of the material from a high tension steel sheet or an extra high tension steel sheet that can perform over 590 N/mm$^2$, an increase of the sheet thickness of the automotive member, an addition of the reinforcement members, or the like. Alternatively, the high structural strength can also be realized by hardening the automotive member manufactured by a steel sheet having tension in a range of 270 N/mm$^2$ to 440 N/mm$^2$ which is in good value for cost together with superior workability.

A door beam can be exemplified to the automotive member as further required to be light weight in addition to the high structural strength, low cost and high workability, as described above. The door beam disclosed in Japanese Patent No. 3,139,984, for example, comprises three members, i.e., a body portion and a pair of mounting portions (or mounted brackets) It discloses that the mounting portions are integrally welded to the both ends of the body portion, and are subjected, if necessary, to a thermal treatment such as hardening or annealing operation (as referred to Column 76 of the Citation).

JP-A-10-166860 discloses the door beam formed by press molding from a single member so as to intend to lower the cost for the thermal treatment such as the hardening or annealing operation. Further, in order to prevent a residual stress occurred in the aforementioned thermal treatment, it has selected the high tension steel requiring no thermal treatment such as the hardening or annealing operation (as referred to Column 19 or others of the Citation). On the contrary, JP-A-2003-094943 takes the issue of a thickness increase and a weight growth of the sheet both caused by intending to keep its structural strength, instead it does not adopt the thermal treatment such as the hardening or annealing operation. Thus, as describing in the specification of JP-A-2003-094943, it discloses a door beam, which is enabled to satisfy the necessary structural strength by thermally treating the molded sheet having a thin thickness into hardening or annealing operation although the door beam is made from a single member as in the aforementioned door beam of JP-A-10-166860.

In order to design for use in a continuous production line, on the other hand, JP-A-09-002066 adopts an electromagnetic induction heating, i.e., a high-frequency hardening operation which can perform a thermal treatment such as the hardening and annealing operations while moving the press-molded door beam along the production line. In particular, it discloses that a door beam is hardened in high frequency only at its body portion defined as an intermediate portion of the door beam required to be improved its structural strength, thereby to satisfy demands for higher structural strength, cheaper, easier workability and lighter weight (as referred to Column 7 or others of the Citation).

In a batch treatment, if it is sufficient, a direct current can be applied as a means for hardening the door beam. JP-B-44-014455 discloses a thermal treatment method for instantaneously hardening and annealing the body to be heated having a long shape like a door beam by applying a pulse current directly to the body. In this JP-B-44-014455, the heating by applying a pulse (AC) current controls the pulse width capable of realizing the instantaneous hardening and annealing operations by considering the "skin effect" caused in the area of the surface of the body to be heated.

SUMMARY OF THE INVENTION

For partially-hardening the automotive member having a complicated structure, the high-frequency hardening operation using an electromagnetic induction coil is frequently employed. On the other hand, in the case of an automotive member having a simple structure, particularly an automotive member having substantially same sectional areas in a direction transverse to its extending direction, it is preferable that a hardening operation by directly applying current is employed. This is because the constitution of a thermal treatment equipment needed can be simplified and because the automotive member can be hardened for a short time period by uniformly heating and quenching it.

Here, in a case of the hardening by directly applying current, a restriction is placed on that the portions other than the portion contacting with the electrode or the current-applying means and the range confined by the electrodes cannot be heated. During the hardening operation, moreover, the automotive member has to be fixed in position by chucks acting as a holding means. These chucks are so restricted as to obstruct neither the passage of an electric current nor the heating or quenching operation. Therefore, investigations have been made on the specification of the automotive member suited for the hardening operation by directly applying current and on the constitution of the thermal treatment equipment for hardening the automotive member by directly applying current.

As a result of the investigations, there is developed a vehicular shock-absorbing beam including a pair of mounting portions disposed at the both ends of a beam body and adapted to be mounted on a vehicle, wherein: the shock-absorbing beam is produced by a thermal treatment equipment used for heat treatment of the beam and the thermal treatment equipment comprising; a pair of holding means for holding and positioning the beam body by utilizing the paired mounting portions as the portions to be held; a pair of current-applying means for applying electricity directly to the beam body by utilizing the paired mounting portions as the portions to be applied electricity, thereby to heat the beam body; a quenching means for quenching the beam body heated; one of the paired holding means can be freely movable back and forth in an arranging direction connecting the paired holding means; one of the paired current-applying means can be freely movable back and forth in an arranging direction connecting the paired current-applying means; and the quenching means sandwiches in the beam body between a lower jig, which is positioned below the beam body held by the holding means and which has a lower corrugated surface followed patterns of lower sectional shape of the beam body, and an upper jig, which has an upper corrugated surface followed patterns of upper sectional shape of the beam body and which approaches downwardly to sandwich the held beam body or leaves therefrom, and quenches by spraying coolant into the heated beam body from a plurality of injection holes provided on the upper and lower corrugated surfaces of the upper and lower jigs. The electric current to be applied is preferably a DC current or a low-frequency (up to 300 Hz) AC current.

The present invention exemplifies, in particular, the vehicular shock-absorbing beam as the automotive member to be treated, so that the shock-absorbing beam may be able to be hardened by directly applying current in a short time period, preferably by directly applying current only once in a short time period. The automotive member, to which the invention is applied, is constituted to have the mounting portions disposed at the both ends of the body as the portions to be held and to be applied current, and is held on the thermal treatment equipment with the mounting portions which are unnecessary to be hardened, so that the body of the member can be hardened by directly applying current to the body through the mounting portions. Here, the body may have substantially same sectional areas in the longitudinal direction or in the transverse direction thereto. Thus, the value of resistance of the body in the direction to have the substantially same sectional areas becomes substantially even so that the body can be uniformly heated. Accordingly, the body of the member can be hardened by directly applying current only once in a short time period.

The long automotive member such as a door beam or a bumper beam, as provided with the mounting portions across the body in the longitudinal direction, has the following specific constitution. The vehicular shock-absorbing beam comprising the beam body having substantially same sectional areas taken at random positions in the longitudinal direction and a pair of the mounting portions disposed across the beam body at the both ends of the beam body in the longitudinal direction, can be used. The vehicular shock-absorbing beam is obtained as the automotive member by the thermal treatment equipment that holds and positions the beam body with those mounting portions as the held portions, functions those mounting portions as the conducting portions as well, heats the beam body by directly applying current in the longitudinal direction of the beam body, and quenches the heated beam body.

The long automotive member such as a side member, a cross member or a pillar, as provided with the mounting portions across the member body in the transverse direction, has the following specific constitution. The automotive member comprising the member body having substantially same sectional areas taken at random positions in the transverse direction, and a pair of the mounting portions disposed across the member body at the both ends of the member body in the transverse direction, can be used. The automotive member is obtained as the automotive member by the thermal treatment equipment that holds the member body with those mounted portions as the held portions, functions those mounting portions as the conducting portions as well, heats the member body by directly applying current in the direction transverse to the longitudinal direction of the member body, and quenches the heated member body.

The thermal treatment equipments exemplified above for hardening each of the various automotive members comprises a pair of the holding means for holding and positioning the body of the member by utilizing the paired mounting portions as the portions to be held, a pair of the current-applying means for applying electricity directly to the member body by utilizing the paired mounting portions as the portions to be applied electricity thereby to heat the member body, and the quenching means for quenching the member body heated.

The holding means can be exemplified by chucks or the like for holding and positioning the automotive member during the hardening operation. In the present invention, to hold and position the main body of the automotive member utilizes the mounting portion as the portion to be held. Therefore, the holding means may take its constitution allowing to utilize the mounting structure of the mounting portions mentioned above. On the other hand, in order to avoid leakage of electricity to the mounting portions or to avoid influence of the heating or the quenching operations through the holding means, the current-applying means can be exemplified by the clip electrodes which are held in contact with the automotive member within the range limited between the paired holding means and thus which is able to carry the DC or AC current to the automotive member. The current-applying means may also be the chuck electrodes acting as holding means. The quenching means can be exemplified by the liquid-cooling means which can quench the automotive member heated.

Since any of the automotive members such as the aforementioned door beam, bumper beam, side member, cross member or pillar is made of a thin steel sheet having a thickness t of about 1.6 mm, its main body may be locally bent, twisted or warped by the residual stress which occurs at the quenching time. Therefore, in the present invention, the thermal treatment equipment is provided with the deformation suppressing means. The deformation suppressing means comprises a plurality of the suppressing protrusions formed on the surface of the lower jig to be set in position below the main body of the automotive member and on the surface of the upper jig facing to the main body of the automotive member. It may constitute that these suppressing protrusions form such an interspace between the top edges of the suppressing protrusions and the main body of the automotive member within tolerance for deformation of the main body at the hardening time.

The deformation suppressing means brings, in case the body of the automotive member begins to be deformed, the suppressing protrusions into abutment against the outer face of the deforming body thereby to suppress the deformation at and after the suppressing protrusions abut. Since the suppressing protrusions are thus formed to suppress the deformation, several suppressing protrusions may be formed on the part highly-predicted to be deformed, for example, on the outer surface of the deformable main body at an intermediate portion of the main body between the paired current-applying means. In order to avoid deformation of the main body caused by influences of the water vapor pressure generated at the quenching process, moreover, an additional constitution can be conceived to provide the upper jig with a plurality of ports for relieving the steam or the like to the outside of the thermal treatment equipment thereby to adjust the pressure on the member body. Here, the suppressing protrusions are not brought into abutment against the outer face of the main body of the member from the beginning, because it is intended not only to prevent the leakage of electricity from the main body of the automotive member but also to prevent the outflow of the heat quantity caused by contacting between the suppressing protrusions and the main body.

Thus, it is secure from contact between the suppressing protrusions in the deformation suppressing means and the outer face of the main body, unless the main body is deformed. However, it is desirable to provide insulating properties for the suppressing protrusions so as to avoid the suppressing protrusions from contact with the automotive member being applied current, or to avoid problems caused by leakage of electricity or the like even without any contact. It is further desirable to provide not only heat resistance but also thermal insulation properties for the suppressing protrusions so as to prevent the outflow of a surplus heat quantity when they contact with the automotive member deformed during cooling operation. In addition, the upper and lower jigs themselves may be provided with the insulating properties or the thermal insulation properties. In this case, it is arbitrary either to combine the suppressing protrusions having the heat resistance and the insulating properties and the upper and lower jigs having the heat resistance and the thermal insulation properties, or, contrary thereto, to combine the suppressing protrusions having the heat resistance and the thermal insulation properties and the upper and lower jigs having the heat resistance and the insulating properties.

In the deformation suppressing means, since the lower jig is held in position in relation to the main body of the automotive member, the lower jig may have the corrugated surface followed patterns of the lower sectional shape of the main body of the automotive member and also have the quenching means having a plurality of the injection holes opening on the corrugated surface. Specifically, the lower jig is utilized as the cooling jacket. In other words, the cooling jacket is utilized as the lower jig, and the suppressing protrusions are formed at necessary portions. In this case, a sufficient interspace is formed between the outer face of the main body of the automotive member and the lower jig so that the surplus coolant injected from the injection holes can be flew away. It is desirable that the coolant is water having a high heat of vaporization and a high specific heat so as to achieve the hardening effect by the quenching operation.

On the other hand, the deformation suppressing means may includes the upper jig adapted to approach the main body of the automotive member downwardly to sandwich it and to leave therefrom, and the suppressing protrusions formed on the inner side surface of the upper jig facing to the main body of the automotive member. The suppressing protrusion may form such an interspace between a top edge of the suppressing protrusion and the main body of the automotive member within tolerance for deformation of the main body. This deformation suppressing means can also be combined with the deformation suppressing means provided to the aforementioned lower jig. Description of the suppressing protrusions of the aforementioned lower jig, such as the issue requiring the insulating properties or the heat resistance to the upper jig or the suppressing protrusions, the combination thereof, the function of the suppressing protrusions or the like, can be applied the same description to those of the upper jig. It can also apply the same description of the lower jig mentioned above to that of the upper jig that the upper jig may have the corrugated surface followed patterns of the upper sectional shape of the main body of the automotive member and also have the quenching means having a plurality of the injection holes opening on the corrugated surface.

If the elongation of the automotive member in its longitudinal direction during the heat treatment is restrained too much, it may cause a distortion occurred in the automotive member. Therefore, one of the paired holding means may move back and forth in the arranging direction connecting the paired holding means each other. Likewise, one of the paired current-applying means may move back and forth in the arranging direction connecting the paired current-applying means each other. As a result, the elongation of the automotive member is permissible and thereby to suppress the distortion of the automotive member.

The back-and-forth moving mechanism of the one of the holding means or that of the current-applying means preferably adopts a sliding mechanism that can limit the elongation of the automotive member in one direction. Here, the current-applying means may apply current through the flexible cables to the clip electrodes that clamps the automotive member. In this case, the back and forth motion of the one of the current-applying means is not required since the automotive member is not restricted by the current-applying means.

According to the present invention, the long automotive member such as the door beam or the bumper beam having the mounting portions across the main body of the member in the longitudinal direction, or the other long automotive member such as the side member, the cross member or the pillar having the mounting portions across the main body of the member in the transverse direction can be hardened by directly applying current only once in a short time period. As a result, the high structural strength required of the main body of the automotive member can be easily realized although the inexpensive steel sheet is used for the door beam, the bumper beam, the side member, the cross member or the pillar. In other words, the invention has an advantage that it is possible to manufacture the automotive member having an excellent cost-benefit performance.

Moreover, the thermal treatment equipment of the present invention having the deformation suppressing means can suppress deformation of the main body of the automotive member, of which the deformation of the main body might be occurred while hardening the main body of the automotive member formed of a relatively thin steel plate having a thickness t of around 1.6 mm such as the door beam, the bumper beam, the side member, the cross member or the pillar, by directly applying current. Still further, the holding means or the current-applying means in the present invention which are both freely movable back and forth can prevent expansion of further deformation thereby to achieve hardening of the main body effectively by the direct current-applying without loss of precision of the entire automotive member.

DETAILED DESCRIPTION OF THE INVENTION

Figure 1:
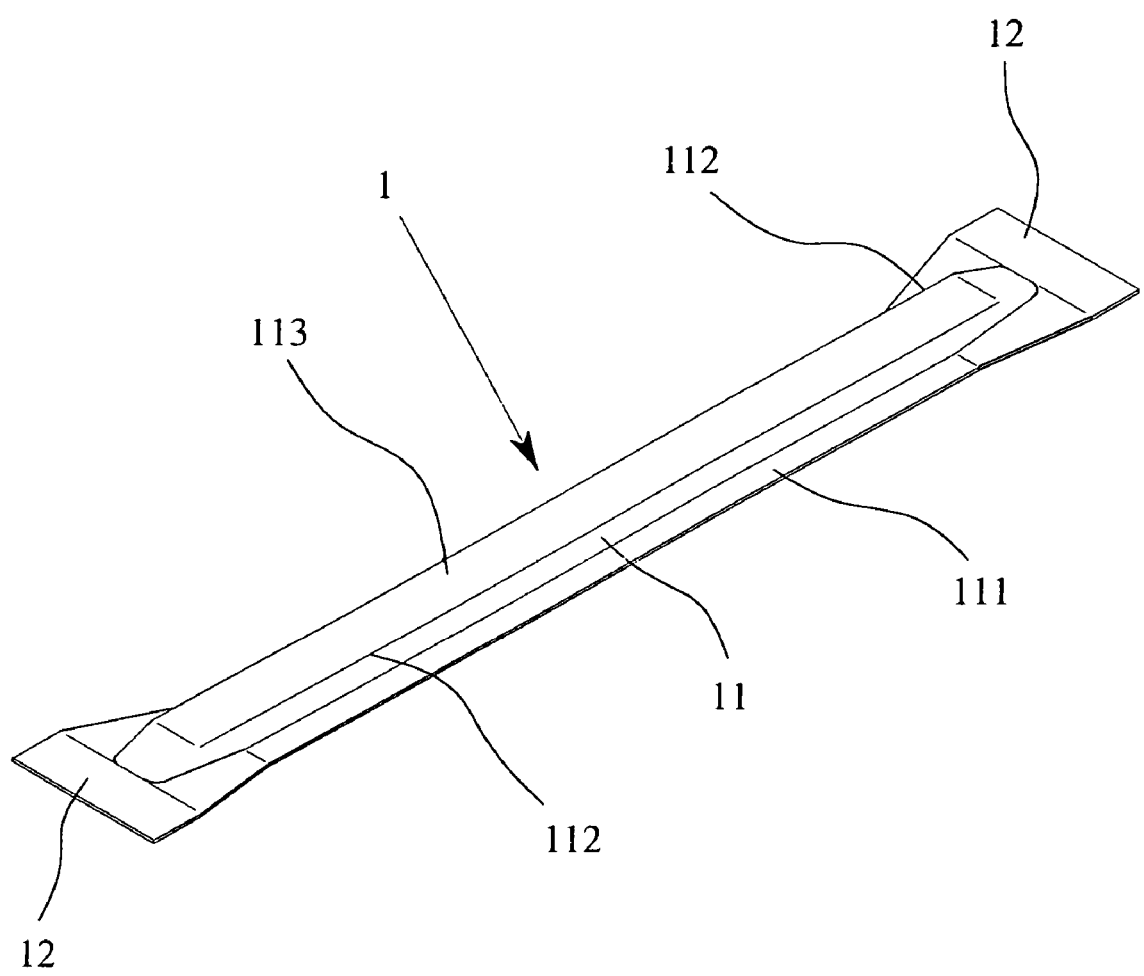
FIG. 1 is a perspective view showing an example of a door beam to be hardened by this invention.

Embodiments of the present invention are described in the following with reference to the accompanying drawings. As shown in FIG. 1, a door beam 1 of this embodiment is a vehicular shock-absorbing beam as an automotive member. This door beam 1 is constituted to include a beam body 11 having substantially same sectional areas taken at random positions in the longitudinal direction, and a pair of mounting portions 12,12 disposed to face each other at the both ends of the beam body 11 adapted to be mounted on the vehicle. This door beam 1 is so formed by press forming, roll forming or hydrostatic forming (e.g., hydraulic forming) an inexpensive and excellently workable general or high-tensile steel sheet, such as the steel sheet having its tensile between 270 N/mm$^2$ to 440 N/mm$^2$, as to form the beam body 11 of a C-shaped section having ribs 111,111 on its both side edges, while leaving the mounting portions 12,12 shaped in an individual flange as it were an plain steel sheet. The beam body 11 has its substantially same sectional areas within a margin of error of plus or minus 10% randomly sampled in direction transverse to the longitudinal direction and thus can exhibit a stable resistance in the longitudinal direction. On the other hand, the mounting portions 12,12 like flanges are so shaped as can be easily clamped by chuck electrodes 21,21 of the thermal treatment equipment.

Figure 2:
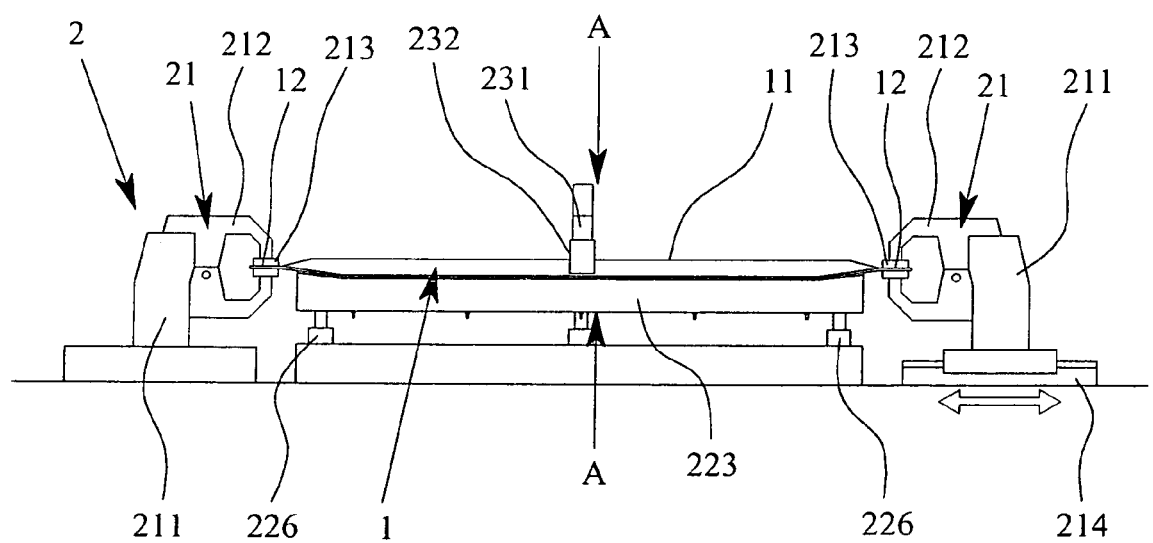
FIG. 2 is a side elevation of the thermal treatment equipment with the door beam held in position.
Figure 4:
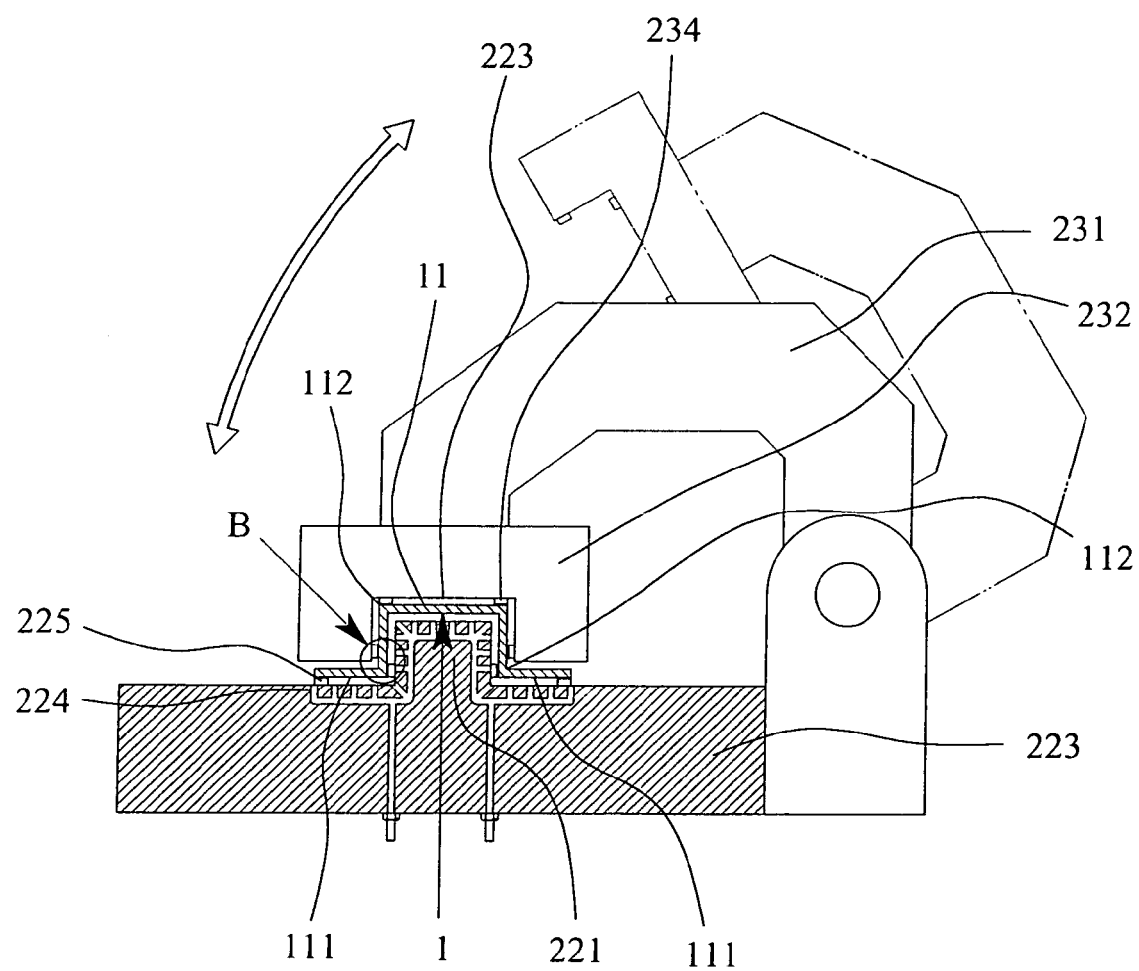
FIG. 4 is a sectional view taken on line A-A in FIG. 2.

The thermal treatment equipment 2 for quenching the door beam 1, as shown in FIGS. 2 and 4, comprises the chuck electrodes 21,21 acting as a pair of the holding-cum-current-applying means for holding the door beam 1 in position and applying current thereto, and a lower jig 223 and an upper jig 232 both acting as the deformation-suppressing-cum-quenching means for quenching the door beam 1 by spraying water while suppressing deformation of the door beam 1 at the quenching time. In the thermal treatment equipment 2 before that the door beam 1 has been held thereto, the upper jig 232 stays above (as referred to the shape illustrated by broken lines in FIG. 4), and the lower jig 223 is held at a lower position. Subsequently, the paired chuck electrodes 21,21 clamp and hold the door beam 1 at predetermined position, the lower jig 223 is lifted up to the held door beam 1, the upper jig 232 is lowered to the held door beam 1, and thereby the process moves to the thermal treatment stage. This sequence of the procedure can be reversed when the door beam 1 thermally treated is to be unloaded.

The chuck electrode 21 comprises the chuck claws 212,212 mounted on the chuck body 211 and be movable to or from each other, and the current-applying blocks 213,213 held and positioned at the top ends of the chuck claws 212,212 in contact with the upper and lower faces of the mounting portions 12,12 of the door beam 1 and functioned to apply current. The current-applying blocks 213,213 are made of an electric conductor, but the chuck claws 212,212 and the chuck body 211 are subjected to an insulating treatment. The electric current is fed to the current-applying blocks 213,213 by the current-applying wires, not illustrated in any of Figures, wiring through the inside of the chuck body 211 and the chuck claws 212,212. In this embodiment, the chuck electrode 21 located on the left side of the individual Figures is kept in position by the chuck body 211. On the other hand, the chuck electrode 21 located on the right side of the individual Figures is mounted on a slider 214 having a back-and-forth moving mechanism for sliding the chuck body 211 in the longitudinal direction of the door beam 1. As a result, the elongation of the door beam 1 in the longitudinal direction occurred during thermal treatment is absorbed by the backward movement of the slidable chuck electrode 21.

Figure 5:
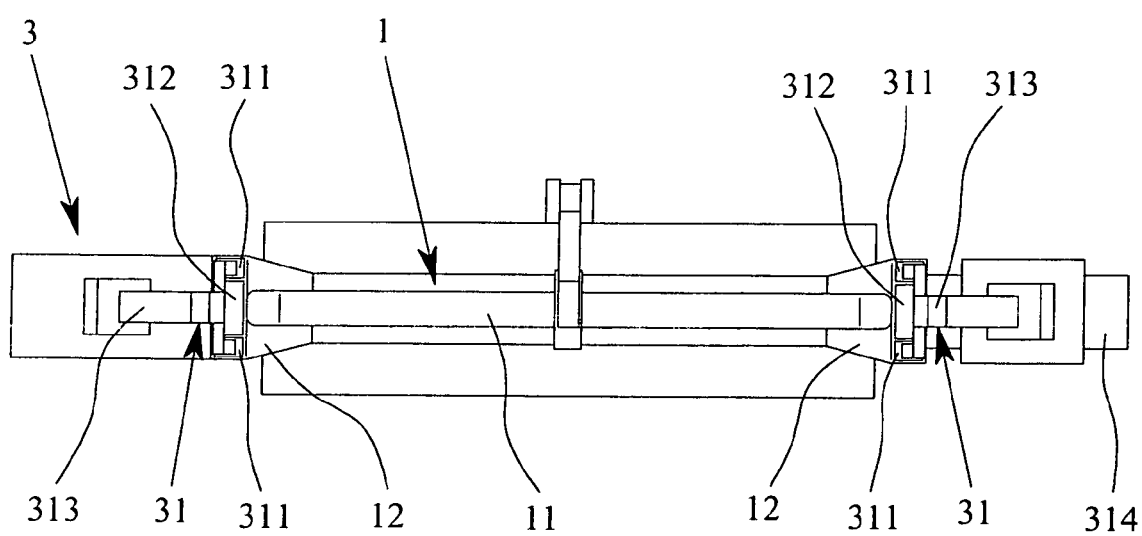
FIG. 5 is a top plan view, corresponding to FIG. 3, of a thermal treatment equipment as another embodiment with a door beam held in position.

In the chuck electrodes 21,21 of this embodiment, the current-applying blocks 213,213 holds and positions the door beam 1 by clamping the mounting portions 12 of the door beam 1 and applies current therefrom. As shown in FIG. 5, on the other hand, the chuck electrodes 31,31 may also be structured by individually attaching the holding blocks 311,311 for clamping the mounting portion 12 of the door beam 1 and the current-applying blocks 312,312 only for having a role of applying current to the top ends of the chuck claws 313,313. In this embodiment, each of the holding block 311 and the current-applying block 312, as being distinctive from each other, are attached to the same chuck claw 313 but use a slider 314 acting as the back-and-forth moving mechanism commonly through the chuck claw 313. In addition, although not illustrated in any of Figures, there can also be provided a chuck electrode having individual back-and-forth moving mechanism applied respectively to the holding block and the current-applying block.

As shown in FIG. 4, the lower jig 223 of this embodiment is provided with a ridge 221 to be fitted upward in the beam body 11 of the door beam 1, and a plurality of injection holes 224 formed in a surface 222 (as referred to FIG. 6) covering substantially the entirety of the lower surface of the beam body 11 for spraying water as a coolant. The lower jig 223 is further provided with a plurality of lower suppressing protrusions 225 corresponding to the shape of the longitudinally intermediate portion of the beam body 11. Some of the injection holes 224 are opening displaced from the lower suppressing protrusions 225 in the longitudinal direction of the door beam 1, so as to avoid overlapping from each other. In other words, the lower jig 223 can perform as a cooling jacket as well. This lower jig 223 can be moved up and down by hydraulic cylinders 226 supporting the lower jigs 223, as referred to FIGS. 2 and 7. As a result, the lower jig 223 is lowered to the standby position before the door beam 1 is held in position in the thermal treatment equipment 2. After the door beam 1 was held in position by the chuck electrodes 21, the lower jig 223 is lifted by the hydraulic cylinders 226 and is so held in position that its ridge 221 is loosely fitted upward in the beam body 11.

The upper jig 232 is a block member having a corrugated surface followed patterns of the upper sectional shape of the beam body 11. The upper jig 232 is attached to the top end of a swing arm 231 that pivotally moves up and down, and, corresponding to the lower suppressing protrusions 225 mentioned above, is further provided on its inner face 233 with the upper suppressing protrusions 234. The lower jig 223 of this embodiment combined a function of the cooling jacket is a long member taken along the longitudinal shape the beam body 11 so as to be provided with the injection holes 224 covering almost all over the beam body 11. However, the main purpose of the upper jig 232 is to suppress deformation of the beam body 11. Therefore, the upper jig 232 is a member shorter than the lower jig 223, as much as the intermediate portion of the lower jig 223, corresponding to an area covering a plurality of the lower suppressing protrusions 225 formed on the lower jig 223.

Figure 6:
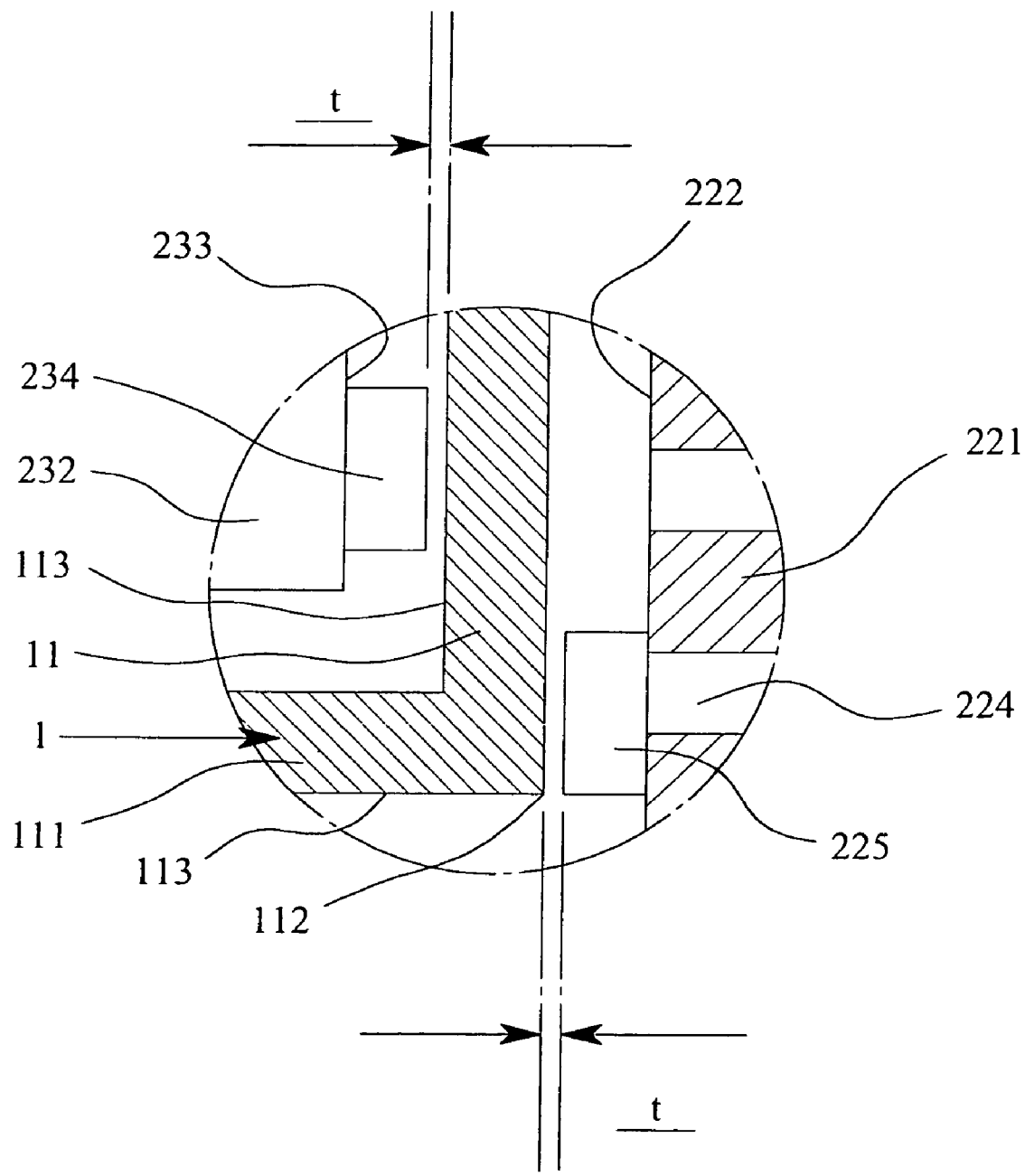
FIG. 6 is an enlarged view of an encircled portion pointed by an arrow B in FIG. 4.

The lower suppressing protrusions 225 and the upper suppressing protrusions 234 are able to be made of either the ceramic block having insulating properties and thermal insulation properties or the carbon block having thermal insulation properties. Moreover, these lower suppressing protrusions 225 and upper suppressing protrusions 234 are arranged in this embodiment at portions which are the most deformable positions while cooling, such as vicinity of the end edges of the ribs 111 or vicinity of the bent edges 112 of the beam body 11. In this manner, if the lower suppressing protrusions 225 or the upper suppressing protrusions 234 are arranged for aiming at the most deformable portions, they can suppress the deformation of the beam body 11 necessarily and sufficiently. These lower suppressing protrusions 225 and the upper suppressing protrusions 234 are positionally set in a non-contact state with respect to the beam body 11, unless the beam body 11 is deformed over a deformation tolerance $\Delta S$. As shown in FIG. 6, more specifically, the corrugated surface 222 of the lower jig 223 and the corrugated surface 233 of the upper jig 232 are individually set at positions spaced greater than the deformation tolerance $\Delta S$ of the beam body 11 from the outer faces 113,113 of the beam body 11. At the same time, the individual protrusions of the lower suppressing protrusions 225 and the upper suppressing protrusions 234 on the two corrugated surfaces 222,233 are set such that interspaces t,t between the outer faces 113,113 of the beam body 11 and respective top ends of those suppressing protrusions 234,225 become smaller than the deformation tolerance ΔS of the beam body 11. As a result, the deformation of the beam body 11 is so restricted within a range to contact with the lower suppressing protrusions 225 or the upper suppressing protrusions 234 that it can be suppressed from excessive deformation of the beam body 11.

Next, it is described the quenching procedure of the door beam 1 by the thermal treatment equipment 2 of this embodiment, as follows. The door beam 1 completed the press forming is held and positioned to the thermal treatment equipment 2 by which the chuck electrodes 21,21 respectively clamp the mounting portions 12,12 like flanges. At this holding and positioning process, the upper jig 232 is pivotally moved away from the door beam 1 accompanying by motion of the swing arm 231 thereby to open over the thermal treatment equipment 2. At the same time, the lower jig 22 lowers and stands by holding the door beam 1 so that the lower jig 223 as well as the upper jig 232 does not obstruct to hold and position the door beam 1. Here, in order to determine uniquely the positional relation of the door beam 1 to the thermal treatment equipment, although not exemplified in any of Figures, it may provide with a locating means comprising the locating lugs formed on the individual lower current-applying blocks 213, 213 of the both chuck electrodes 21,21 and the locating lugholes, corresponding to the aforementioned locating lugs, formed on the mounting portions of the door beam.

Figure 3:
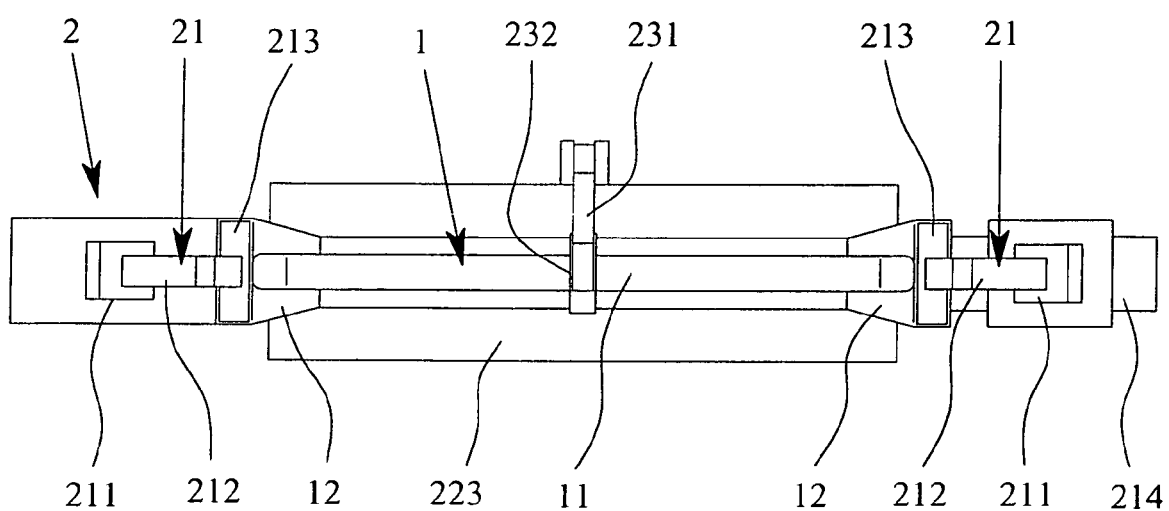
FIG. 3 is a top plan view of a thermal treatment equipment with the door beam held in position.

When the door beam 1 is held in position, the lower jig 223 is lifted by the hydraulic cylinders 226 to loosely-fit the ridge 221 in the beam body 11. Subsequently, the upper jig 232 attached to the top end of the swing arm 231 approaches to the beam body 11 and thereby to loosely-sandwich it. Thus, the preparation for applying current to the beam body 11 is completed as can be seen in FIGS. 2 to 4. At this preparation stage for applying current, neither the lower suppressing protrusions 225 nor the upper suppressing protrusions 234 makes contact with the beam body 11 while keeping the interspace t within the deformation tolerance ΔS, as shown in FIG. 6. Since the interspace t is very small (e.g., 0.5 mm to 1.5 mm), however, the lower suppressing protrusions 225 or the upper suppressing protrusions 234 may come into contact with the beam body 11 if the door beam 1 after formed is delicately twisted or bent. Therefore, the lower suppressing protrusions 225 or the upper suppressing protrusions 234 are made of either the ceramic block having insulating properties and thermal insulation properties or the carbon block having thermal insulation properties.

The door beam 1 has a thickness t of about 1.6 mm, and the beam body 11 has a length of 600 mm to 1,500 mm, although it differs depending upon the type of the automobile. In case, therefore, the beam body 11 of the door beam 1 is quenched by directly applying current, the beam body 11 can be heated to a heating temperature of 1,000° C. to 1,200° C. if the power of a low-frequency AC current of 50 Hz to 250 Hz and about 3,000 A is applied for about several tens of seconds. The heating temperature of the beam body 11 can also be adjusted, for example, by regulating the current value. If, however, the current value is lowered, the heating time is taken long to cause a problem of deterioration of production efficiency. Here, the heating temperature is proportional to the electric power so that the heating temperature of the beam body 11 can be adjusted by regulating the time period for applying current. It is, therefore, advisable that the time period for applying current is set to regulate the heating temperature necessary for the quenching to 850° C. to 950° C. or higher but not to exceed the heating limit of 1,250° C. of the steel sheet or the material for the automotive member such as the door beam, and that the heating temperature is then finely adjusted by the time period for applying current.

After the beam body 11 of the door beam 1 was heated for a predetermined current-applying time period to the heating temperature (i.e., 1,000° C. to 1,200° C.) necessary for the quenching, it stops to apply current, sprays water from the injection holes 224 formed in the lower jig 223, and quenches the beam body 11. Since the automotive member used in the present invention has a small thickness such as that for the door beam 1 in this embodiment, it has such a small heat capacity proportional to the volume that it can be easily cooled for a short time period by spraying water having a high specific heat. Thus, the invention has an advantage that the door beam 1 having the quenched beam body 11 can be manufactured efficiently by finishing the heating and cooling operations for the short time period.

If the beam body 11 of the door beam 1 is deformed while quenching, the lower suppressing protrusions 225 of the lower jig 223 or the upper suppressing protrusions 234 of the upper jig 232 individually come into abutment against the outer face 113 of the deformed beam body 11 to suppress the excessive deformation of the beam body 11. In case, on the other hand, the door beam 1 is elongated in the longitudinal direction by the deformation of the beam body 11, one of the paired chuck electrode 21,21 in this embodiment, as located on the right side in the individual Figures, is slid back by utilizing the slider 214 thereby to absorb that longitudinal elongation.

Figure 7:
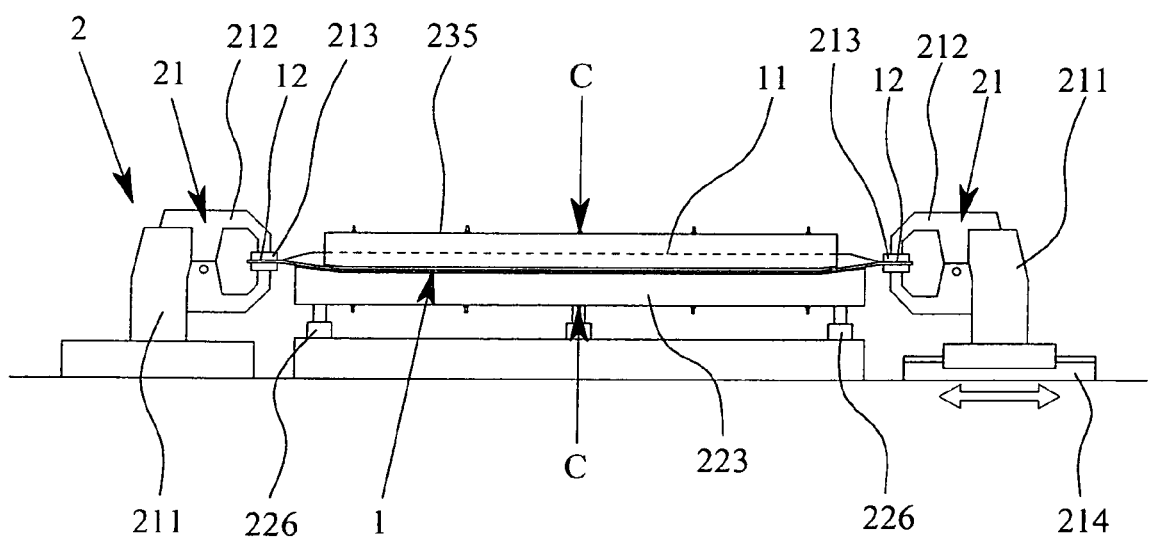
FIG. 7 is a side elevation, corresponding to FIG. 2, of a thermal treatment equipment having an upper jig for covering a door beam.
Figure 8:
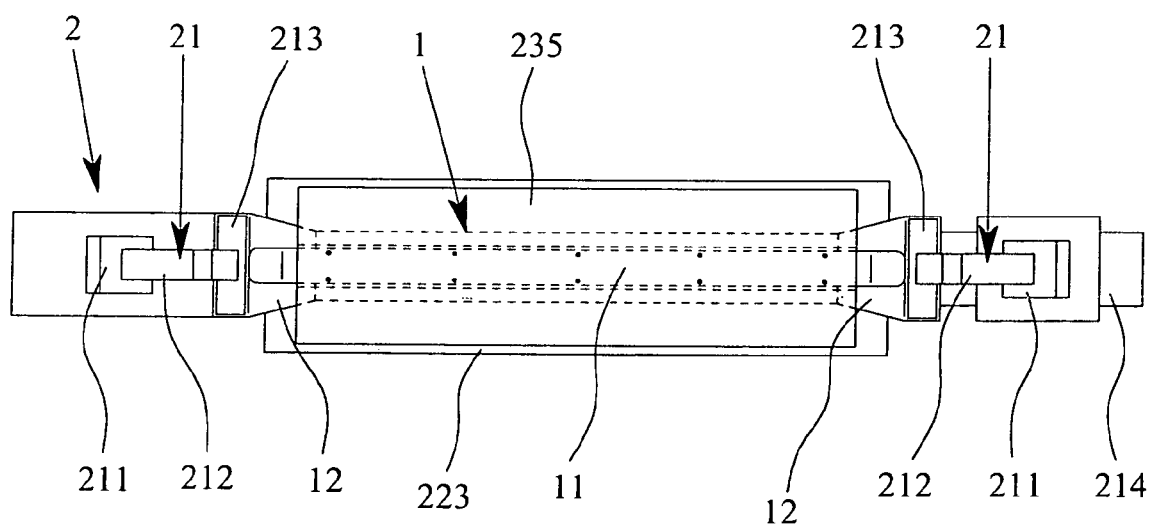
FIG. 8 is a top plan view, corresponding to FIG. 3, of the thermal treatment equipment having the upper jig for covering the door beam.
Figure 9:
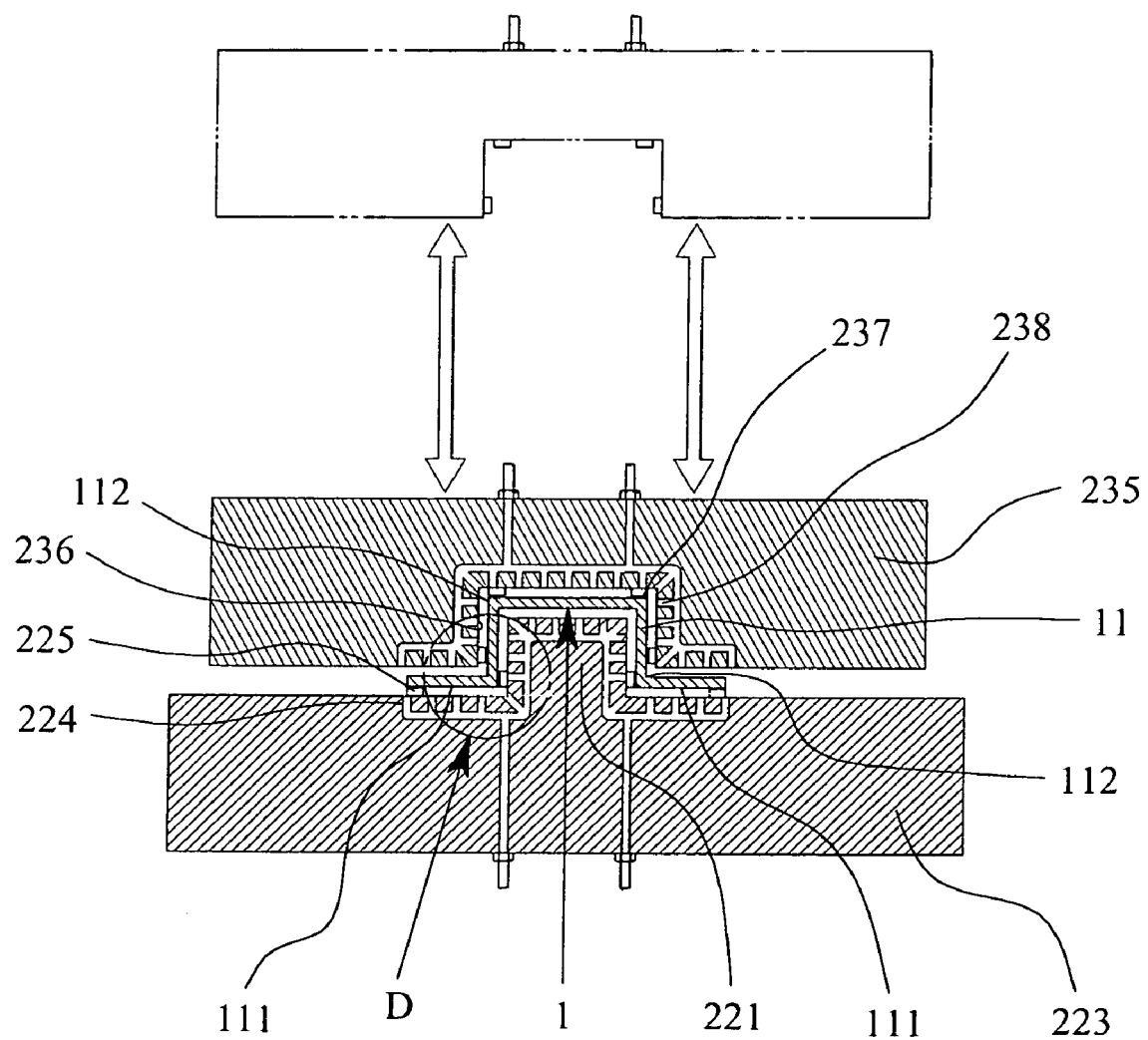
FIG. 9 is a sectional view taken on line C-C in FIG. 7.

In order to quench the beam body 11 of the door beam 1 uniformly, the cover-shaped upper jig 235 for covering the almost upper face of the beam body 11 can be used, as shown in FIGS. 7 to 9. This upper jig 235 is so vertically brought close to or apart from the beam body 11 by the various lifting means known in the art, such as the cylinders (not illustrated in any of Figures), as to keep direction of its corrugated surface. The upper jig 235 is thus held in position to cover the beam body 11. This cover-shaped upper jig 235 is provided, like the aforementioned upper jig 232, with upper suppressing protrusions 237 on its corrugated surface 236 and, like the lower jig 223, with a plurality of injection holes 238 opened therein. Some of the injection holes 238 are opening displaced from the upper suppressing protrusions 237 in the longitudinal direction of the door beam 1.

Figure 10:
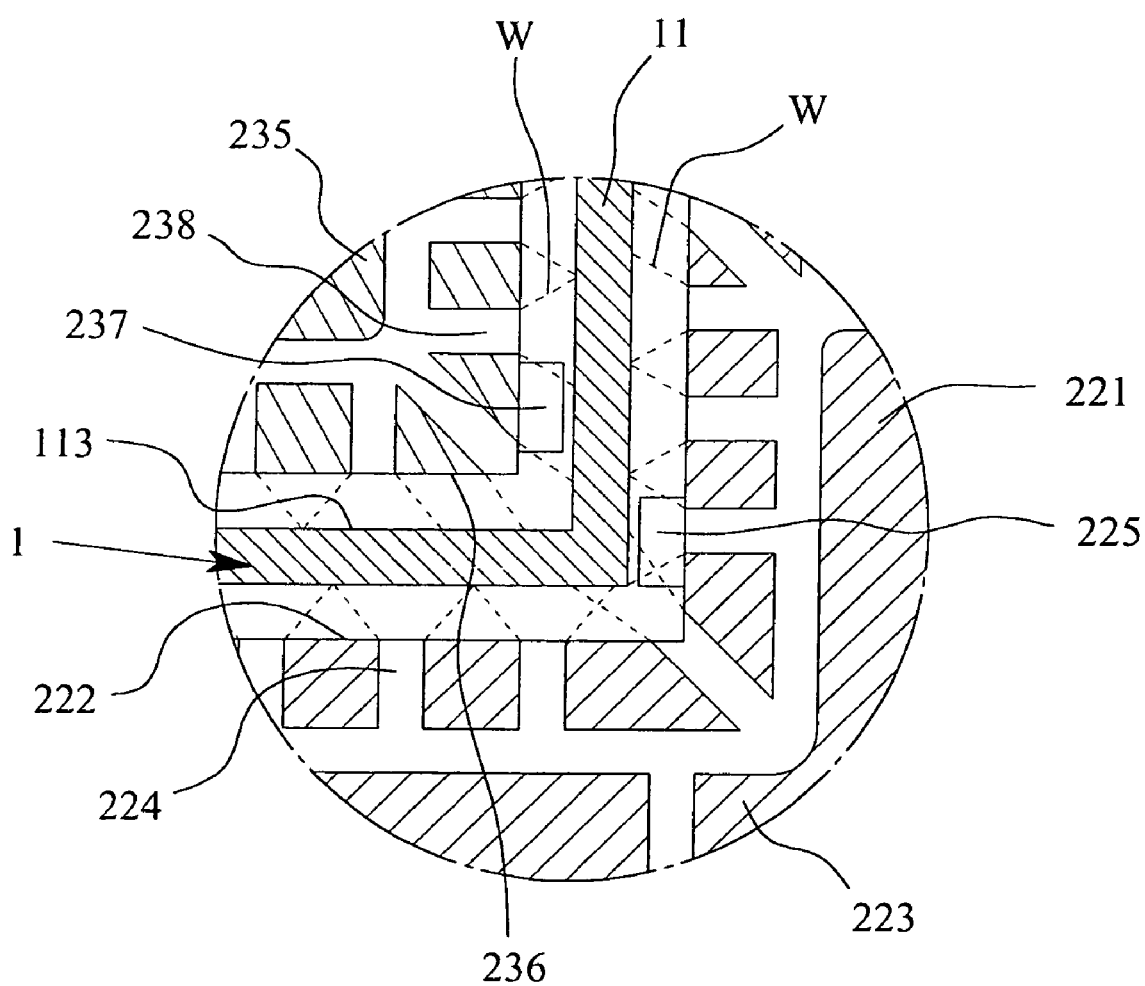
FIG. 10 is an enlarged view of an encircled portion pointed by an arrow D in FIG. 9.

As shown in FIG. 10, the beam body 11 of the door beam 1 is rapidly quenched by water W sprayed simultaneously from the individual injection holes 224,238 of the lower and upper jigs 223,235. Since the injection holes 238 of the upper jig 235 are arranged equivalently in the longitudinal direction of the beam body 11, the beam body 11 of the door beam 1 can be quenched equivalently in its longitudinal direction. Moreover, the corrugated surface 236 of the upper jig 235 is provided with the upper suppressing protrusions 237 so that the deformation of the beam body 11, as might otherwise be caused, can be suppressed. When the quenching operation is completed, the upper jig 235 is brought back upwardly (as referred to FIG. 9).

The present invention can be applied to an automotive member including a main body constituted to have a plurality of substantially same sectional areas taken at random position in the longitudinal direction or in the transverse direction, and a pair of mounting portions disposed across the main body in the longitudinal or transverse direction.

The present invention can also be applied, for example, to a bumper beam having a structure which cannot be distinguished between the main body and the mounting potions, in contrast to that of the embodiments described above. In the case of the bumper beam, the mounting portions are defined as the portions located at the both end portions of the bumper beam, to which the bumper supporting members are attached. In the thermal treatment equipment of this case, the bumper body can be quenched by directly applying current while clamping the mounting portions with the chuck electrodes performing as the holding-cum-current-applying means.

The present invention can also be applied to another automotive member such as a cross member comprising a main body having substantially same sectional areas taken at random position in the transverse direction, and a pair of mounting portions disposed across the main body in the transverse direction. In the case of the cross member, the portions corresponding to the mounting portions are flanges extended to the both sides of the member body. In the thermal treatment equipment of this case, the two flanges extending along the member body are clamped by a plurality of chuck electrodes, and the current is applied in the transverse direction of the cross member. By thus providing a number of the chuck electrodes, it is advantageous that the elongation of the cross member in the longitudinal direction can be absorbed by the expansion of the clearance between the individual chuck electrodes.

What is claimed is:

1. A vehicular shock-absorbing beam including a pair of mounting portions disposed at both ends of a beam body and adapted to be mounted on a vehicle, wherein:
   the shock-absorbing beam is produced by a thermal treatment equipment used for heat treatment of the beam and the thermal treatment equipment comprising;
      a pair of holding means for holding and positioning the beam body by utilizing the paired mounting portions as the portions to be held;
      a pair of current-applying means for applying electricity directly to the beam body by utilizing the paired mounting portions as the portions to be applied electricity, thereby to heat the beam body;
      a quenching means for quenching the beam body heated;
      one of the paired holding means can be freely movable back and forth in an arranging direction connecting the paired holding means;
      one of the paired current-applying means can be freely movable back and forth in an arranging direction connecting the paired current-applying means;
      the quenching means sandwiches in the beam body between a lower jig, which is positioned below the beam body held by the holding means and which has a lower corrugated surface followed patterns of lower sectional shape of the beam body, and an upper jig, which has an upper corrugated surface followed patterns of upper sectional shape of the beam body and which approaches the held beam body downwardly to sandwich or leaves therefrom, and quenches by spraying coolant into the heated beam body from a plurality of injection holes provided on the upper and lower corrugated surfaces of the upper and lower jigs; and
      said quenching means of the thermal treatment equipment comprises a deformation suppressing means having a plurality of suppressing protrusions from the upper and lower corrugated surfaces of the upper and lower jigs to form an interspace between a top edge of the suppression protrusion and the beam body thereby to suppress deformation of the beam body within tolerance for deformation while quenching.

2. The vehicular shock-absorbing beam produced by the thermal treatment equipment according to claim 1, an operation of which the upper jig approaches to the beam body or leaves therefrom is realized by a swing arm that pivotally moves up and down.

3. The vehicular shock-absorbing beam produced by the thermal treatment equipment according to claim 1, an operation of which the upper jig approaches to the beam body or leaves therefrom is realized by the vertical movement of the beam body while keeping a positioning direction of the upper corrugated surface of the upper jig.

* * * * *